United States Patent
Hayashi et al.

(10) Patent No.: US 11,964,559 B2
(45) Date of Patent: Apr. 23, 2024

(54) VEHICLE CONTROL DEVICE AND VEHICLE CONTROL METHOD

(71) Applicant: ISUZU MOTORS LIMITED, Tokyo (JP)

(72) Inventors: Satoshi Hayashi, Fujisawa (JP); Masaichi Takahashi, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 512 days.

(21) Appl. No.: 17/275,927

(22) PCT Filed: Sep. 11, 2019

(86) PCT No.: PCT/JP2019/035596
§ 371 (c)(1),
(2) Date: Mar. 12, 2021

(87) PCT Pub. No.: WO2020/054740
PCT Pub. Date: Mar. 19, 2020

(65) Prior Publication Data
US 2022/0032770 A1    Feb. 3, 2022

(30) Foreign Application Priority Data
Sep. 13, 2018  (JP) ................................ 2018-171744

(51) Int. Cl.
*B60K 31/00* (2006.01)
*B60W 30/16* (2020.01)

(52) U.S. Cl.
CPC .. *B60K 31/0008* (2013.01); *B60K 2031/0025* (2013.01); *B60K 2031/0033* (2013.01); *B60W 30/16* (2013.01); *B60W 2554/802* (2020.02)

(58) Field of Classification Search
CPC ........ B60K 31/0008; B60K 2031/0025; B60K 2031/0033
See application file for complete search history.

(56) References Cited

U.S. PATENT DOCUMENTS 5,451,820 A * 9/1995 Gotoh ................... G01S 15/931
307/10.6
5,675,518 A * 10/1997 Kuroda ................... G01S 7/003
702/158

(Continued)

FOREIGN PATENT DOCUMENTS

CN    102205845 A    10/2011
CN    102758694 A    10/2012

(Continued)

OTHER PUBLICATIONS

The State Intellectual Property Office of People's Republic of China, The First Office Action, Application No. CN 201980059967.8, dated Jul. 26, 2022.

(Continued)

*Primary Examiner* — Luis A Martinez Borrero
(74) *Attorney, Agent, or Firm* — Procopio, Cory, Hargreaves & Savitch LP

(57) ABSTRACT

This vehicle control device includes: a distance measurement unit that measures the distance between a vehicle and a preceding vehicle; and an engine control unit that starts up an engine when, in comparison to a distance measured by the distance measurement unit once a host vehicle has stopped and an engine mounted in the host vehicle has stopped, a distance newly measured by the distance measurement unit increases by at least an offset amount that indicates the amount of increase in distance used to determine whether to start up the engine.

6 Claims, 3 Drawing Sheets

(56) References Cited

U.S. PATENT DOCUMENTS

| | | | | |
|---|---|---|---|---|
| 6,529,814 | B2* | 3/2003 | Ishizu | B60K 31/0008 180/170 |
| 6,622,078 | B1* | 9/2003 | Kuragaki | B60W 30/17 701/96 |
| 6,683,533 | B1* | 1/2004 | Ashihara | G01S 11/02 340/436 |
| 7,831,369 | B2* | 11/2010 | Naik | B60K 31/0008 701/55 |
| 7,853,401 | B2* | 12/2010 | Hoetzer | B60K 31/0008 701/115 |
| 8,676,443 | B2* | 3/2014 | Han | B60W 10/20 701/41 |
| 9,349,292 | B2* | 5/2016 | Yang | G08G 1/166 |
| 10,290,210 | B2* | 5/2019 | Wolterman | G08G 1/096716 |
| 11,220,276 | B2* | 1/2022 | Natsumi | F16D 57/04 |
| 2004/0098196 | A1* | 5/2004 | Sekiguchi | G01S 17/931 340/436 |
| 2005/0216169 | A1* | 9/2005 | Arai | B60W 30/16 180/170 |
| 2007/0112494 | A1* | 5/2007 | Naik | F02N 11/0837 701/55 |
| 2009/0312933 | A1* | 12/2009 | Hoetzer | B60K 31/0008 701/102 |
| 2011/0246043 | A1* | 10/2011 | Maruyama | G08G 1/166 701/96 |
| 2012/0016573 | A1* | 1/2012 | Ellis | B60K 31/0008 701/112 |
| 2012/0277982 | A1 | 11/2012 | Weaver | |
| 2013/0144502 | A1* | 6/2013 | Shida | B60K 31/0008 701/96 |
| 2015/0134223 | A1* | 5/2015 | Kim | B60W 30/14 701/93 |
| 2017/0107926 | A1 | 4/2017 | Ishii et al. | |
| 2018/0038952 | A1* | 2/2018 | Shokonji | G01S 15/86 |
| 2018/0065630 | A1* | 3/2018 | Tamura | G08G 1/22 |
| 2018/0178795 | A1 | 6/2018 | Takada et al. | |
| 2018/0222480 | A1* | 8/2018 | Shokonji | B60W 30/17 |
| 2018/0362042 | A1* | 12/2018 | Ishikawa | B60W 20/30 |
| 2019/0084572 | A1* | 3/2019 | Oishi | B60Q 1/40 |
| 2020/0023847 | A1* | 1/2020 | Takahashi | B60W 30/18072 |
| 2020/0331498 | A1* | 10/2020 | Natsumi | B60W 30/18145 |
| 2022/0410887 | A1* | 12/2022 | Oshita | B60W 30/17 |
| 2023/0140476 | A1* | 5/2023 | Oshita | B60W 30/16 701/93 |
| 2023/0331228 | A1* | 10/2023 | Oshita | B60T 8/17558 |

FOREIGN PATENT DOCUMENTS

| | | |
|---|---|---|
| JP | H08-276806 A | 10/1996 |
| JP | H08-293100 A | 11/1996 |
| JP | H10147160 A | 6/1998 |
| JP | H11-002143 A | 1/1999 |
| JP | 2000045819 A | 2/2000 |
| JP | 2003201881 A | 7/2003 |
| JP | 2005-023839 A | 1/2005 |
| JP | 2005-247143 A | 9/2005 |
| JP | 2006-316644 A | 11/2006 |
| JP | 2015209112 A | 11/2015 |
| JP | 2016000976 A | 1/2016 |
| JP | 2016-049830 A | 4/2016 |
| JP | 2016-107772 A | 6/2016 |
| JP | 6187769 B2 * | 8/2017 |
| JP | 2018020720 A | 2/2018 |

OTHER PUBLICATIONS

Japanese Patent Office, Notice of Reasons for Refusal, Application No. JP 2018-171744, dated Sep. 13, 2022, in 9 pages.

International Search Report and Written Opinion for related PCT App No. PCT/JP2019/035596 dated Nov. 26, 2019, 9 pgs. (partial translation).

* cited by examiner

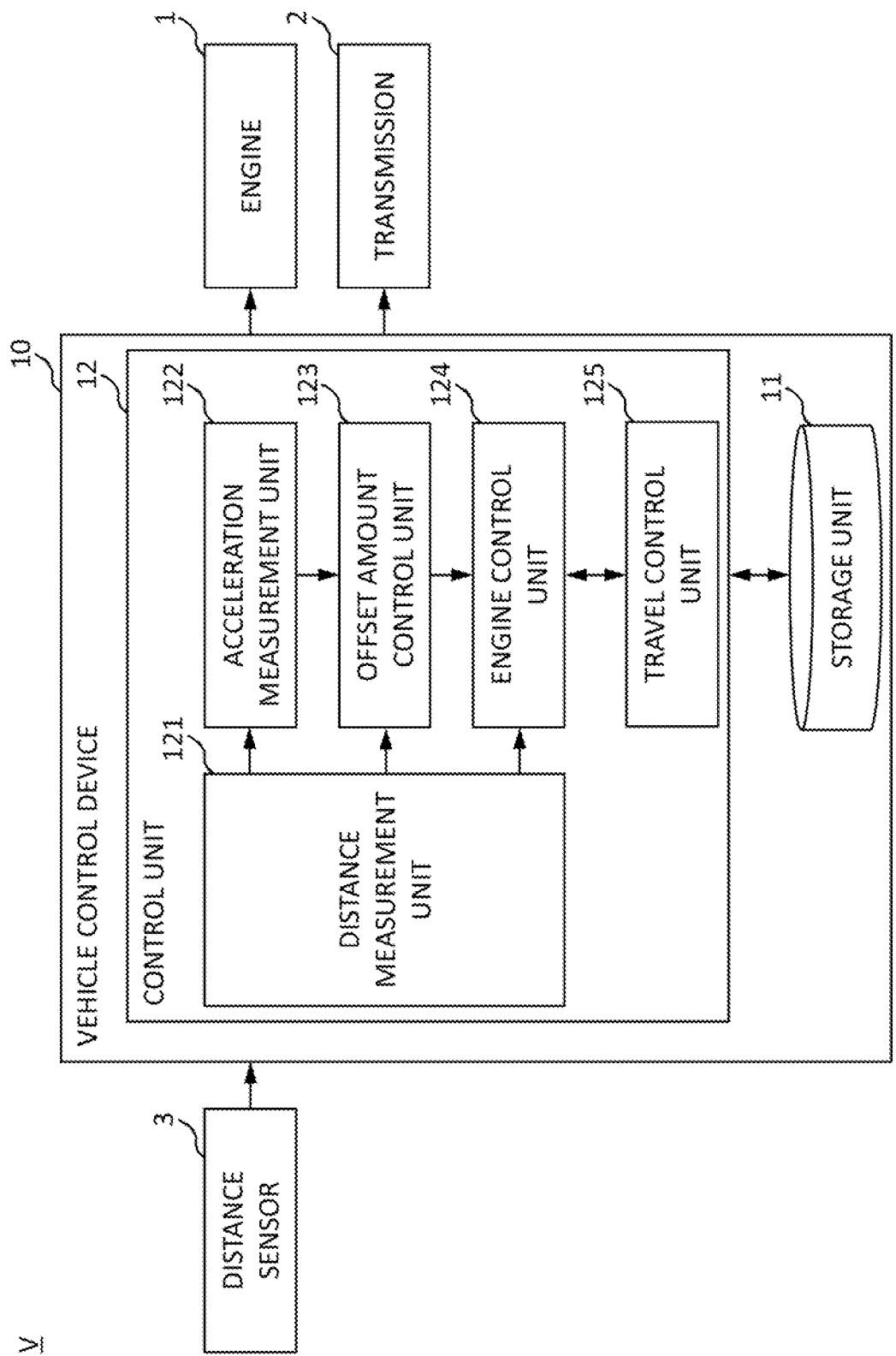

VEHICLE CONTROL DEVICE AND VEHICLE CONTROL METHOD

CROSS-REFERENCE TO RELATED APPLICATIONS

This application is a U.S. National Stage entry of PCT Application No: PCT/JP2019/035596 filed Sep. 11, 2019, which claims priority to Japanese Patent Application No. 2018-171744 filed Sep. 13, 2018, the contents of which are incorporated herein by reference.

TECHNICAL FIELD

The present disclosure relates to a vehicle control device and a vehicle control method.

BACKGROUND ART

An all-speed adaptive cruise control (ACC) is known to be capable of traveling following a preceding vehicle at all vehicle speeds (for example, refer to Patent Literature 1).

CITATION LIST

Patent Literature

Patent Literature 1: JP-A-2016-000976

SUMMARY OF INVENTION

Technical Problem

Incidentally, in the all-speed ACC, starting an engine after idling is stopped is a problem. In a case of starting an engine after idling is stopped in a vehicle of the related art, the engine is started after idling is stopped by decreasing a brake opening degree, but since a user does not need to operate the brake in an all-speed ACC, there is a problem that the engine cannot be started based on the brake opening degree.

An object of the present disclosure is to provide a vehicle control device and a vehicle control method that can start an engine at an appropriate timing after idling is stopped.

Solution to Problem

A vehicle control device according to the present disclosure includes:
a distance measurement unit that measures a first forward distance, which is a distance between an own vehicle and a preceding vehicle; and
an engine control unit that starts an engine installed in the own vehicle when a first forward distance newly measured by the distance measurement unit increases by at least an offset amount indicating an increase amount of the first forward distance used to determine whether to start the engine, compared to the first forward distance measured by the distance measuring unit, in a case where the own vehicle is stopped and the engine is stopped.

The vehicle control device may further include an offset amount control unit that controls the offset amount.

The vehicle control device may further include an acceleration measurement unit that measures an acceleration of the preceding vehicle, in which in a case where the own vehicle is stopped and the engine is stopped, the offset amount control unit may decrease the offset amount in a case where the acceleration of the preceding vehicle measured by the acceleration measurement unit is greater than a first threshold value, and increase the offset amount in a case where the acceleration of the preceding vehicle is less than a second threshold value, which is equal to or less than the first threshold value.

The distance measurement unit may measure a rearward distance which is a distance between the own vehicle and a following vehicle, and in a case where the own vehicle is stopped and the engine is stopped, the offset amount control unit may decrease the offset amount in a case where the rearward distance measured by the distance measurement unit is greater than a third threshold value, and increase the offset amount in a case where the rearward distance is less than a fourth threshold value, which is equal to or less than the third threshold value.

The distance measurement unit may measure a second forward distance which is a distance between the preceding vehicle and a leading vehicle that travels ahead of the preceding vehicle, and in a case where the own vehicle is stopped and the engine is stopped, the offset amount control unit may decrease the offset amount in a case where the second forward distance measured by the distance measurement unit is greater than a fifth threshold value, and increase the offset amount in a case where the second forward distance is less than a sixth threshold value, which is equal to or less than the fifth threshold value.

A vehicle control method according to the present disclosure, executed by a computer, includes:
a step of measuring a distance between an own vehicle and a preceding vehicle; and
a step of starting an engine installed in the own vehicle when a newly-measured distance increases by at least an offset amount indicating an increase amount of the distance used to determine whether to start the engine, compared to the distance measured in a case where the own vehicle is stopped and the engine is stopped.

Advantageous Effects of Invention

The vehicle control device and the vehicle control method of the present disclosure can start the engine at an appropriate timing after idling is stopped.

BRIEF DESCRIPTION OF DRAWINGS

FIG. 2 is a view schematically illustrating an internal configuration of a vehicle according to the embodiment.

DESCRIPTION OF EMBODIMENTS

Figure 1A:
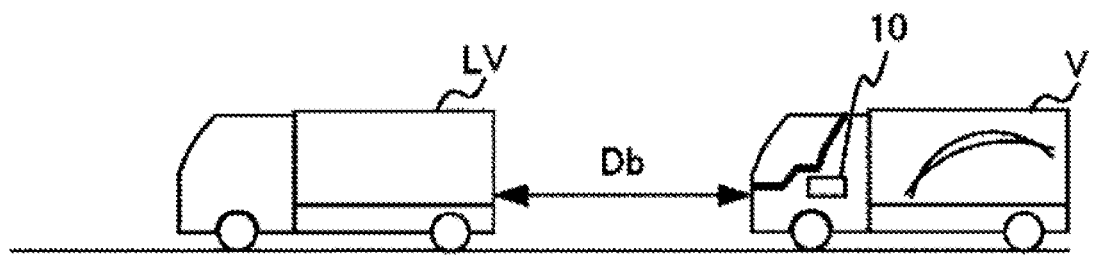
FIG. 1A is a view describing an overview of a vehicle control device according to an embodiment.
Figure 1B:
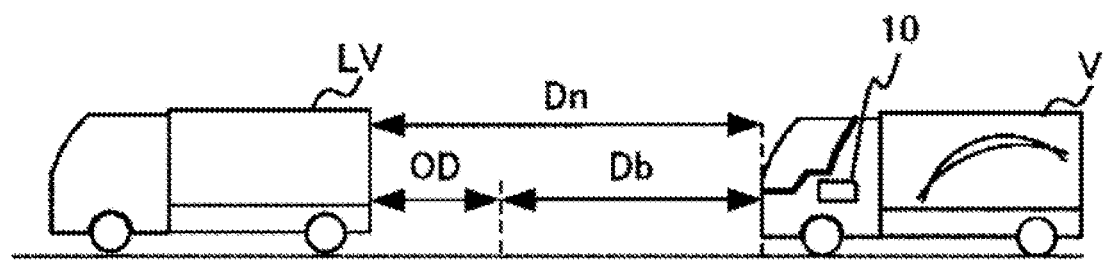
FIG. 1B is a view describing an overview of the vehicle control device according to the embodiment.

FIGS. 1A and 1B are views describing an overview of a vehicle control device 10 according to an embodiment. The vehicle control device 10 is a computer such as an electronic control unit (ECU) installed in a vehicle V, and is a device that controls the vehicle V in a case where a vehicle speed of the vehicle V is equal to or greater than 0 km to realize an all-speed ACC that causes the vehicle V to travel following a preceding vehicle LV even when a driver does not operate an accelerator or a shift lever.

The vehicle control device 10 measures a distance Db between the vehicle V and the preceding vehicle LV when the vehicle V is stopped and an engine installed in the vehicle V is stopped, as illustrated in FIG. 1A, in a case where the vehicle control device 10 is set to an auto cruise mode, which is a mode in which the vehicle V travels by the all-speed ACC. The vehicle control device 10 starts the engine when the preceding vehicle LV starts and a newly-measured distance Dn increases by at least an offset amount OD, compared to the distance Db, as illustrated in FIG. 1B. The vehicle control device 10 makes the vehicle V travel following the preceding vehicle LV.

Accordingly, the vehicle V can travel following the preceding vehicle LV without referring to an amount of brake opening degree. Since the vehicle control device 10 starts the engine and performs following traveling in a case where the distance between the vehicle V and the preceding vehicle LV increases by at least the offset amount OD, it is possible to suppress a start of the engine when the preceding vehicle LV moves slightly, and to suppress deterioration of fuel efficiency. Accordingly, the vehicle control device 10 can start the engine at an appropriate timing to realize the all-speed ACC of the vehicle V. The following is a detailed description of the vehicle control device 10.

[Configuration of Vehicle V]

An internal configuration of the vehicle V will be described for describing the vehicle control device 10 in detail. FIG. 2 is a view schematically illustrating the internal configuration of the vehicle V according to the embodiment. The vehicle V includes an engine 1, a transmission 2, a distance sensor 3, and the vehicle control device 10.

The vehicle V is, for example, a large vehicle which is driven by a driving force of the engine 1, such as a diesel engine, and is capable of traveling in the auto cruise mode as described above. The transmission 2 transmits a rotational driving force of the engine 1 to drive wheels (not illustrated) of the vehicle V. The transmission 2 includes a multi-stage gear to convert the rotational driving force of the engine 1.

The distance sensor 3 includes, for example, a millimeter wave radar and is provided at a front part of the vehicle V. The distance sensor 3 irradiates the front part of the vehicle V with millimeter waves every predetermined time (for example, several milliseconds to several tens of milliseconds), and receives millimeter waves (reflected waves) reflected by the preceding vehicle LV traveling in front of the vehicle V. The distance sensor 3 measures the distance between the vehicle V and the preceding vehicle LV based on a time after the irradiation of millimeter waves to the reception of the reflected waves. The distance sensor 3 outputs distance information indicating the distance between the vehicle V and the preceding vehicle LV to the vehicle control device 10.

[Configuration of Vehicle Control Device 10]

Next, the configuration of the vehicle control device 10 will be described with reference to FIG. 2. The vehicle control device 10 includes a storage unit 11 and a control unit 12, as illustrated in FIG. 2.

The storage unit 11 is, for example, a read only memory (ROM) or a random access memory (RAM). The storage unit 11 stores various programs to make the control unit 12 function.

The control unit 12 is a calculation resource including a processor, such as a central processing unit (CPU) (not illustrated). The control unit 12 functions as a distance measurement unit 121, an acceleration measurement unit 122, an offset amount control unit 123, an engine control unit 124, and a travel control unit 125 by executing the program stored in the storage unit 11.

The distance measurement unit 121 measures the distance between the vehicle V and the preceding vehicle LV by acquiring the distance information from the distance sensor 3.

The acceleration measurement unit 122 measures an acceleration of the preceding vehicle LV. For example, the acceleration measurement unit 122 measures the acceleration of the preceding vehicle LV by differentiating the distance measured by the distance measurement unit 121 two times, in a case where the vehicle V is stopped and the engine 1 is stopped.

The offset amount control unit 123 controls an offset amount, which indicates an increase amount of the distance between the vehicle V and the preceding vehicle LV, used to determine whether to start the engine 1. Specifically, the offset amount control unit 123 decreases the offset amount in a case where the acceleration of the preceding vehicle LV measured by the acceleration measurement unit 122 is greater than a first threshold value in a case where the vehicle V is stopped and the engine 1 is stopped. The offset amount control unit 123 increases the offset amount in a case where the acceleration of the preceding vehicle LV is less than a second threshold value, which is equal to or less than the first threshold value.

For example, the offset amount control unit 123 sets the offset amount to be a first offset amount which is less than a preset offset amount in a case where the acceleration of the preceding vehicle LV is greater than the first threshold value, which is measured in a case where the vehicle V is stopped and the engine 1 is stopped. The offset amount control unit 123 sets the offset amount to be a second offset amount which is greater than the preset offset amount in a case where the acceleration of the preceding vehicle LV is less than the second threshold value, which is measured in a case where the vehicle V is stopped and the engine 1 is stopped.

In a case where the acceleration of the preceding vehicle LV is relatively high, it is considered that there is a high possibility that a driver of the preceding vehicle LV desires to start the preceding vehicle LV and continue traveling. In a case where the acceleration of the preceding vehicle LV is relatively low, it is considered that there is a high possibility that the driver of the preceding vehicle LV tries to narrow the distance between the preceding vehicle LV and a leading vehicle and stop the vehicle again. Therefore, the vehicle control device 10 can control whether to start the engine 1, reflecting a travel start status of the preceding vehicle LV, by varying the offset amount based on the acceleration of the preceding vehicle LV.

The distance sensor 3 may also be provided at a rear part of the vehicle V to measure a distance between the vehicle V and a following vehicle (not illustrated) traveling immediately behind the vehicle V. The distance sensor 3 may output a second distance information indicating the distance to the vehicle control device 10, and the distance measurement unit 121 may measure the distance between the vehicle V and the following vehicle by acquiring the second distance information.

The offset amount control unit 123 may decrease the offset amount in a case where the distance between the vehicle V and the following vehicle measured by the distance measurement unit 121 is greater than a third threshold value, and may increase the offset amount in a case where the distance between the vehicle V and the following vehicle is less than a fourth threshold value, which is equal to less than the third threshold value. In this manner, the vehicle control device 10 can increase the offset amount in a case where an interval between the vehicle V and the following vehicle is extremely narrowed. Accordingly, even in a case where the vehicle V travels on a congested road or the like, it is possible to increase a traveling distance at one time in a case of traveling while following the preceding vehicle LV, and the following vehicle can also increase the traveling distance in a case of being started. In this manner, the vehicle control device 10 can contribute to alleviating traffic congestion by suppressing a frequent repetition of starting and stopping of the following vehicle.

The vehicle control device 10 may further include a camera (not illustrated) that captures images of the front part of the vehicle V. For example, the camera is provided above a seat of the driver of the vehicle V and can capture images of not only the preceding vehicle LV but also the leading vehicle traveling immediately ahead of the preceding vehicle LV. The distance measurement unit 121 of the vehicle control device 10 analyzes the images captured by the camera to measure a distance between the vehicle V and the leading vehicle traveling ahead of the preceding vehicle, and also to measure a vehicle length of the preceding vehicle LV. The distance measurement unit 121 may measure the distance between the preceding vehicle LV and the leading vehicle, based on the distance between the vehicle V and the preceding vehicle LV based on the distance information acquired from the distance sensor 3, the vehicle length of the preceding vehicle LV, and the distance between the vehicle V and the leading vehicle.

In this case, the offset amount control unit 123 may decrease the offset amount in a case where the distance between the preceding vehicle LV and the leading vehicle is greater than a fifth threshold value, and may increase the offset amount in a case where the distance between the preceding vehicle LV and the leading vehicle is less than a sixth threshold value, which is equal to or less than the fifth threshold value. In this manner, the vehicle control device 10 can increase the offset amount in a case where an interval between the leading vehicle and the preceding vehicle LV is extremely narrowed. Accordingly, in a case where the vehicle V travels on a congested road or the like, when the interval between the leading vehicle and the preceding vehicle LV is extremely narrowed, the vehicle can start with a margin, and the travelling distance can be increased in a case where the vehicle V is started. In this manner, the vehicle control device 10 suppresses a frequent repetition of starting and stopping of the vehicle V. and as a result, the frequent repetition of starting and stopping of the following vehicle is suppressed, and thus, it is possible to contribute to the alleviation of traffic congestion.

The offset amount control unit 123 may vary the offset amount based on at least one of the acceleration of the preceding vehicle, the distance between the vehicle V and the following vehicle, and the distance between the preceding vehicle LV and the leading vehicle. In this manner, the vehicle control device 10 can set the offset amount to an appropriate value based on a status of vehicles traveling in front of and behind the vehicle V.

The engine control unit 124 starts the engine 1 when the distance newly measured by the distance measurement unit 121 increases by at least the offset amount, compared to the distance between the vehicle V and the preceding vehicle LV measured by the distance measurement unit 121, in a case where the vehicle V is stopped and the engine 1 stopped.

Specifically, the engine control unit 124 specifies the distance as an inter-vehicle distance when the vehicle V is stopped, when the distance between the vehicle V and the preceding vehicle LV measured by the distance measurement unit 121 does not vary for at least a predetermined time (for example, 3 seconds or more), in a case where the vehicle V is stopped and the engine 1 installed in the vehicle V is stopped.

The engine control unit 124 starts the engine 1 when the distance between the vehicle V and the preceding vehicle LV, which is newly measured by the distance measurement unit 121, increases by at least the offset amount, compared to the inter-vehicle distance, after the inter-vehicle distance when the vehicle V is stopped is specified.

When the engine 1 is started by the control of the engine control unit 124, the travel control unit 125 causes the engine control unit 124 to control the engine and controls the transmission 2, and accordingly, the vehicle V travels following the preceding vehicle LV.

[Flow of Process of Starting Engine 1]

Figure 3:
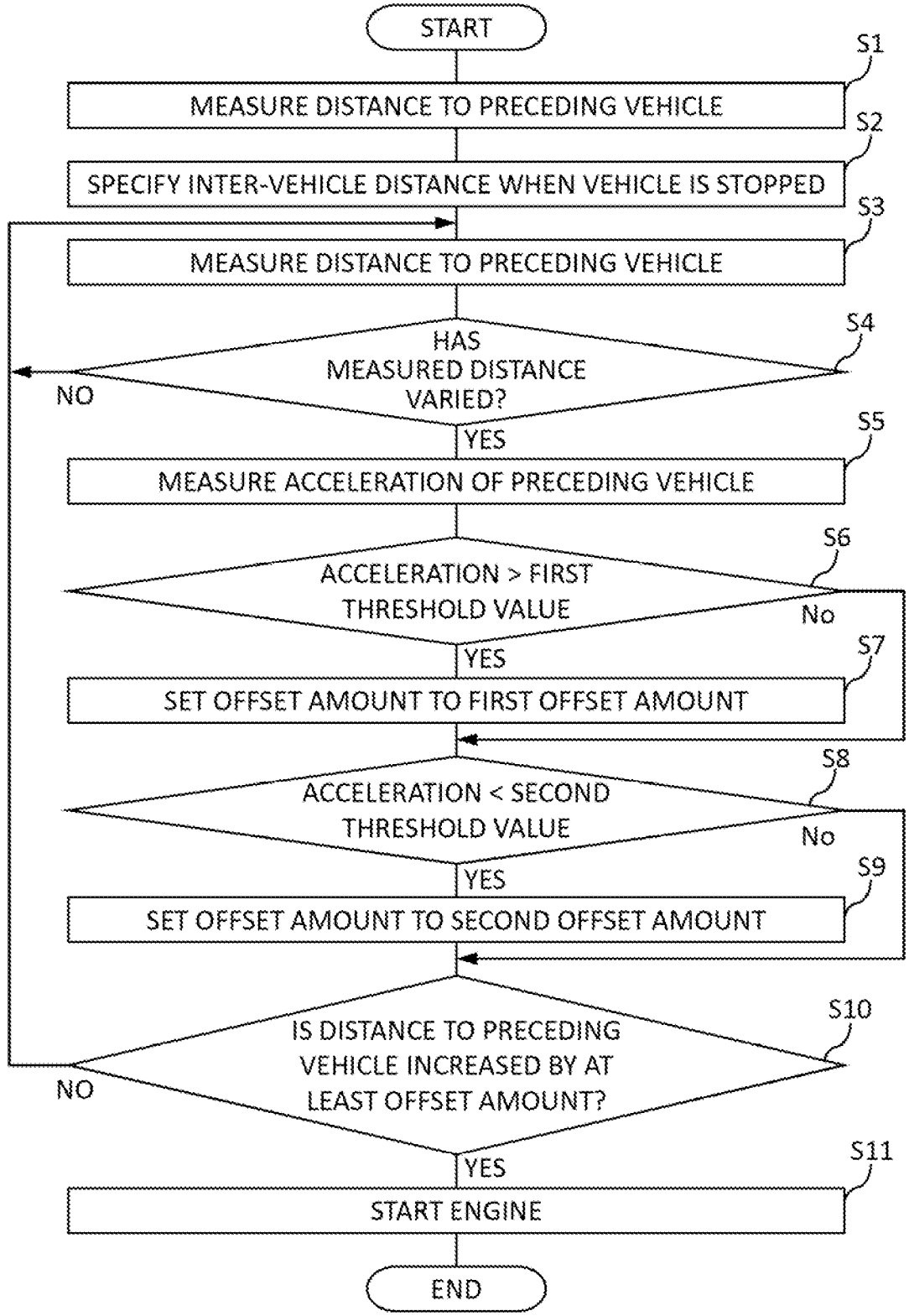
FIG. 3 is a flowchart illustrating a flow of a process in the vehicle control device after an engine of the vehicle according to the embodiment is stopped until the engine is started.

Next, a flow of a process in the vehicle control device 10 after the vehicle V is stopped and the engine 1 is stopped until the engine 1 is started is described. FIG. 3 is a flowchart illustrating a flowchart of a process in the vehicle control device 10 after the engine 1 of the vehicle V according to the embodiment is stopped until the engine is started. In this flowchart, the offset amount control unit 123 controls the offset amount based on the acceleration of the preceding vehicle LV.

First, the distance measurement unit 121 measures the distance between the vehicle V and the preceding vehicle LV (S1). The engine control unit 124 specifies the inter-vehicle distance to the preceding vehicle LV when the vehicle V is stopped, in a case where the vehicle V is stopped and the engine 1 is stopped (S2).

Then, the distance measurement unit 121 measures the distance between the vehicle V and the preceding vehicle LV (S3).

Then, the engine control unit 124 determines whether the distance between the preceding vehicle LV and the vehicle V measured in S3 has varied (S4). When the engine control unit 124 determines that the distance between the vehicle V and the preceding vehicle LV has varied, the process moves to S5, and when the engine control unit 124 determines that the distance between the vehicle V and the preceding vehicle LV has not varied, the process moves to S3.

Then, the acceleration measurement unit 122 measures the acceleration of the preceding vehicle LV based on the measured distance (S5).

Then, the offset amount control unit 123 determines whether the measured acceleration of the preceding vehicle LV is higher than the first threshold value (S6). When the offset amount control unit 123 determines that the measured acceleration of the preceding vehicle LV is greater than the first threshold value, the process moves to S7, and the offset amount is set to the first offset amount, which is smaller than the preset offset amount. When the offset amount control unit 123 determines that the measured acceleration of the preceding vehicle LV is equal to or less than the first threshold value, the process moves to S8.

In S8, the offset amount control unit 123 determines whether the measured acceleration of the preceding vehicle LV is less than the second threshold value. When the offset amount control unit 123 determines that the measured acceleration of the preceding vehicle LV is less than the second threshold value, the process moves to S9, and the offset amount is set to the second offset amount, which is larger than the preset offset amount. When the offset amount control unit 123 determines that the measured acceleration of the preceding vehicle LV is equal to or greater than the second threshold value, the process moves to S10.

Then, the engine control unit 124 determines whether the distance between the preceding vehicle LV and the vehicle V measured in S3 has increased by at least an offset amount, compared to the inter-vehicle distance specified in S2 (S10). When the engine control unit 124 determines that the distance between the vehicle V and the preceding vehicle LV has increased by at least an offset amount, the process moves to S11 and the engine 1 is started, and when the engine control unit 124 determines that the distance between the vehicle V and the preceding vehicle LV has not increased by at least an offset amount, the process moves to S3.

Effect of Present Embodiment

As described above, the vehicle control device 10 according to the embodiment starts the engine 1 when a newly-measured distance between the vehicle V and the preceding vehicle LV increases by at least the offset amount indicating the increase amount of the distance used to determine whether to start the engine 1, compared to the distance between the vehicle V and the preceding vehicle LV, which is measured in a case where the vehicle V is stopped and the engine 1 installed in the vehicle V is stopped.

Accordingly, since the vehicle control device 10 starts the engine 1 and performs the following traveling in a case where the distance between the vehicle V and the preceding vehicle LV increases by at least the offset amount, it is possible to suppress the start of the engine 1 when the preceding vehicle LV moves slightly, and to suppress deterioration of fuel efficiency. Accordingly, the vehicle control device 10 can start the engine 1 at an appropriate timing to realize the all-speed ACC of the vehicle V.

Above, although the present disclosure has been described using embodiments, the technical scope of the present disclosure is not limited to the scope described in the above-described embodiment, and various modifications and changes are possible within the scope of the gist.

For example, in the above-described embodiment, the engine control unit 124 specifies the distance as the inter-vehicle distance when the vehicle V is stopped, when the distance between the vehicle V and the preceding vehicle LV measured by the distance measurement unit 121 does not vary for at least a predetermined time, in a case where the vehicle V is stopped and the engine 1 installed in the vehicle V is stopped, but the disclosure is not limited thereto. For example, the travel control unit 125 may stop the vehicle V such that the distance between the preceding vehicle LV and the vehicle V becomes a preset inter-vehicle distance, in a case where the vehicle V is stopped following the preceding vehicle LV.

For example, the specific embodiment of the dispersion and integration of devices is not limited to the above embodiment, and can be configured by functionally or physically distributing and integrating all or a part of the embodiments in any unit. New embodiments resulting from any combination of multiple embodiments are also included in the present disclosure. The effects of the new implementation resulting from the combination will combine the effects of the original implementation.

The present invention contains subject matter related to Japanese Patent Application (Patent Application No. 2018-171744) filed on Sep. 13, 2018, the entire contents of which are incorporated herein by reference.

INDUSTRIAL APPLICABILITY

The vehicle control device and the vehicle control method of the present disclosure are advantageous in that an engine is started at an appropriate timing after idling is stopped.

REFERENCE SIGNS LIST

1 . . . Engine
2 . . . Transmission
3 . . . Distance sensor
10 . . . Vehicle control device
11 . . . Storage unit
12 . . . Control unit
121 . . . Distance measurement unit
122 . . . Acceleration measurement unit
123 . . . Offset amount control unit
124 . . . Engine control unit
125 . . . Traveling control unit
V . . . Vehicle
LV . . . Preceding vehicle

The invention claimed is:

1. A vehicle control device comprising:
a distance measurement unit that measures a first forward distance, which is a distance between an own vehicle and a preceding vehicle; and
an engine control unit that, in a case where the own vehicle is stopped and an engine is stopped, starts an engine installed in the own vehicle when a first forward distance newly measured by the distance measurement unit increases by at least an offset amount indicating an increase amount of the first forward distance used to determine whether to start the engine, and keeps the engine stopped when the first forward distance newly measured does not increase by the offset amount, compared to the first forward distance measured by the distance measuring unit,
wherein the first forward distance newly measured is larger than the first forward distance.

2. The vehicle control device according to claim 1 further comprising:
an offset amount control unit that controls the offset amount.

3. The vehicle control device according to claim 2, further comprising:
an acceleration measurement unit that measures an acceleration of the preceding vehicle,
wherein in a case where the own vehicle is stopped and the engine is stopped, the offset amount control unit decreases the offset amount in a case where the acceleration of the preceding vehicle measured by the acceleration measurement unit is greater than a first threshold value, and increases the offset amount in a case where the acceleration of the preceding vehicle is less than a second threshold value which is equal to or less than the first threshold value.

4. The vehicle control device according to claim 2,
wherein the distance measurement unit measures a rearward distance which is a distance between the own vehicle and a following vehicle, and
in a case where the own vehicle is stopped and the engine is stopped, the offset amount control unit decreases the offset amount in a case where the rearward distance measured by the distance measurement unit is greater than a third threshold value, and increases the offset amount in a case where the rearward distance is less than a fourth threshold value which is equal to or less than the third threshold value.

5. The vehicle control device according to claim 2, wherein the distance measurement unit measures a second forward distance which is a distance between the preceding vehicle and a leading vehicle that travels ahead of the preceding vehicle, and in a case where the own vehicle is stopped and the engine is stopped, the offset amount control unit decreases the offset amount in a case where the second forward distance measured by the distance measurement unit is greater than a fifth threshold value, and increases the offset amount in a case where the second forward distance is less than a sixth threshold value which is equal to or less than the fifth threshold value.

6. A vehicle control method, executed by a computer, comprising:

a step of measuring a distance between an own vehicle and a preceding vehicle; and a step of, in a case where the own vehicle is stopped and an engine is stopped, starting an engine installed in the own vehicle when a newly-measured distance increases by at least an offset amount indicating an increase amount of the distance used to determine whether to start the engine, and keeping the engine stopped when the newly-measured distance does not increase by the offset amount, compared to the distance measured, wherein the newly-measured distance is larger than the distance.

\* \* \* \* \*